May 26, 1964  S. E. MILLER, JR  3,134,917
STEPPER MOTOR
Filed Nov. 3, 1960

INVENTOR.
SYDNEY E. MILLER JR.
BY *Elliott & Pastoriza*
ATTORNEYS

United States Patent Office 3,134,917
Patented May 26, 1964

3,134,917
STEPPER MOTOR
Sidney E. Miller, Jr., 5207 W. 115th St.,
Los Angeles, Calif.
Filed Nov. 3, 1960, Ser. No. 67,066
3 Claims. (Cl. 310—49)

This invention relates generally to electrical motors and more particularly to an improved stepper motor for moving a shaft through discrete increments in response to electrical pulses.

Various designs for stepper motors have been proposed to provide a shaft rotation through a discrete distance each time an input electrical pulse is received. Some of these are designed to provide an electro-magnetic field with which a magnetized rotor will align itself, the field being stepped to assume discrete directions by a suitable electronic logic circuit. Other type designs provide a back-and-forth motion which is converted to incremental forward movements of a shaft by a suitable ratchet mechanism.

In many applications of stepper motors, it is desirable to provide a relatively high output shaft torque without exceeding given dimensions for the unit and given limits on the input pulse power available. The requirements are rather stringent, particularly in the case of stepper controls for missiles wherein extremely small dimensions, light mass, and minimum power are primary considerations.

It is an important object of the present invention, accordingly, to provide a greatly improved stepper motor which yields a higher output shaft torque in response to a given input power pulse than any stepper motors heretofore available of comparable mass and dimensions.

More particularly, it is an object to provide an improved high torque stepper motor which is bi-directional in that it may be stepped in either direction by applying electrical pulses to one or the other of two inputs.

Another important object is to provide a stepper motor which accurately indexes to each stepped position.

More general objects of the invention are to provide an improved stepper motor which is extremely rugged in physical construction, can withstand extreme temperature changes, shocks, vibrations, and the like, and is relatively long lived as compared to similar motors presently available.

Briefly, these and other objects and advantages of this invention are attained by specially designed magnetic circuits providing a very high torque on an output shaft within a given space and for a given amount of electrical power available. In the preferred form of the invention, this design takes the form of a plurality of electro-magnets equivalent to U-shape configurations having their north and south poles alternately positioned in a circular array. A rotor is mounted for rotation on a shaft co-axial with the axis of the circular array and includes a plurality of U-shaped configurations terminating in pole pieces corresponding in number to the poles of the circular array and positioned juxtaposed the poles. A biasing means is arranged to bias the rotor to a position in which face portions of the pole pieces are circumferentially offset from the poles of the circular array in a given direction and by a distance less than one-half the circumferential spacing between adjacent poles in the circular array.

With the foregoing arrangement, momentary energization of the various coils will exert a strong attraction on each of the pole pieces of the rotor simultaneously to total a relatively large torque on the rotor. Cessation of the pulse to de-energize the electro-magnets will remove this torque on the rotor. The biasing means will then simply return the rotor to its initial position. Thus, the rotor is caused to execute a single back-and-forth movement for each pulse of electrical energy received. This motion may be converted by conventional ratchet means to incremental output shaft steps in a given forward direction.

Because of the arrangement of the various electro-magnetic coils and the geometry of the rotor, the overall dimensions of the stepper motor construction may be kept within desired limits and yet the required output torque on the shaft can readily be achieved.

For bi-directional stepping, an additional plurality of electro-magnets may be arranged in a circular array opposed to the first-mentioned circular array to sandwich the rotor pole pieces therebetween. By making the rotor pole pieces asymmetric so that opposite pole piece faces are offset, energization of the additional electro-magnetic coils will effect a stepping of the rotor in an opposite direction to that caused upon energization of the first plurality of electro-magnets.

A better understanding of the invention will be had by referring to a preferred embodiment as illustrated in the accompanying drawings, in which.

Figure 1:
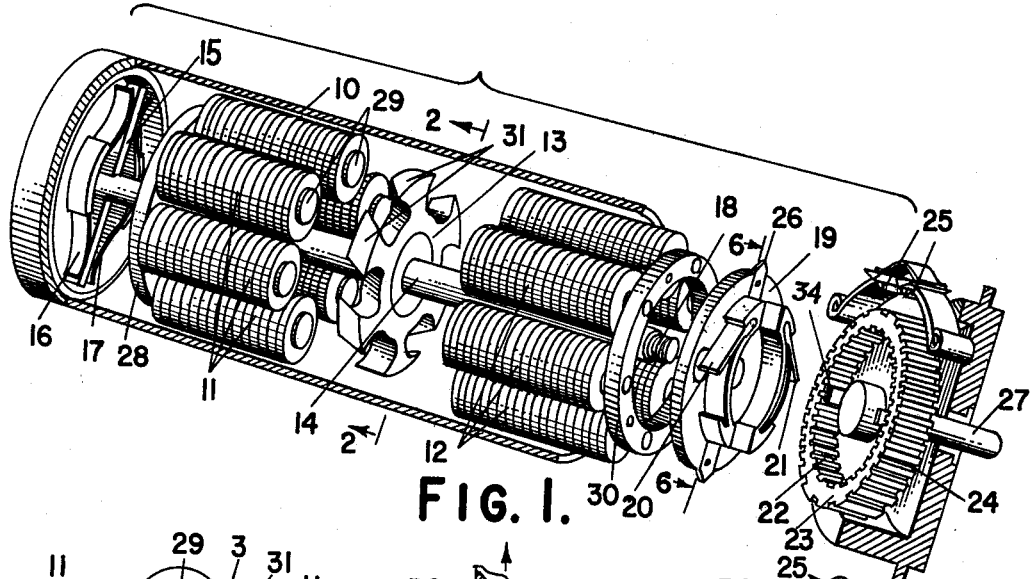
FIGURE 1 is an exploded perspective view showing the principal components making up the stepper motor of this invention.

Referring first to FIGURE 1, there is shown a casing 10 housing a plurality of electro-magnets 11 arranged in a generally circular array with the axes of the various magnet coils running parallel to each other. Also shown in the particular embodiment set forth is an additional plurality of electro-magnets 12 similarly arranged in a circular array in opposing relationship to the electro-magnets 11. Disposed between the respective arrays is a rotor 13 mounted for rotation by a shaft 14 co-axial with the axis of the casing and respective coil arrays.

The rear end of the shaft 14 as shown in FIGURE 1 terminates in a transverse bar 15 having its ends disposed between the resilient ends of leaf springs 16 and 17. The leaf springs have their central portions anchored in a stationary position to the casing 10 as shown. With this arrangement, the shaft 14 and rotor 13 are biased to a given neutral position to which the rotor will return after cessation of any torque exerted in either direction upon the rotor.

The forward end 18 of the rotor shaft 14 as viewed in FIGURE 1 is secured to a ratchet mechanism 19 including ratchet pawls 20 and 21. These pawls are arranged to engage inside gear teeth 22 on a ratchet gear 23. The gear 23 includes external gear teeth 24 for the purpose of indexing movement of the gear. These indexing teeth 24 are arranged to receive indexing dogs 25 supported by the casing and normally biased into engagement with the teeth 24. The dogs 25 are lifted from the teeth upon stepping action by raised projections 26 on the ratchet mechanism 19 as will become clearer as the description proceeds. The ratchet gear 26 is mounted on an output shaft 27.

The various electro-magnetic coils 11 are magnetically connected at their rear ends by a flux carrier ring 28 which defines a closed flux path between adjacent ends of the electro-magnetic coils, thereby effectively providing a plurality of U-shaped electro-magnets having their north and south poles 29 alternately positioned in the circular array as described. Similarly, a flux carrier ring 30 serves to close the adjacent ends of the additional electro-magnets 12 to provide a second plurality of U-shaped magnets. The rotor 13 in turn is provided with projecting pole pieces 31 constituting the leg ends of generally U-shape structures. These pole pieces 31 correspond in number to the alternate north and south poles 29 of the various electro-magnets 11 and are asymmetric in that their opposite faces 32 and 33 are offset from each other in a circumferential direction. The neutral position to which the rotor is biased by the leaf spring structure and transverse bar 15 is such that the face portion 32 of each pole piece 31 is circumferentially offset from its adjacent electro-magnetic coil pole 29 by a distance less than one-half the circumferential distance between adjacent poles 29. By this arrangement, energization of all of the electro-magnets 11 will simultaneously exert a torque on each of the pole piece faces tending to pull the same into alignment.

Figure 2:
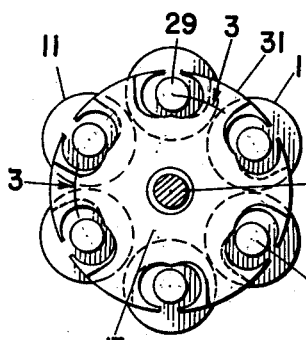
FIGURE 2 is a cross section taken generally in the direction of the arrows 2—2 of FIGURE 1 after the device is assembled and showing the rotor in a neutral position.
Figure 3:
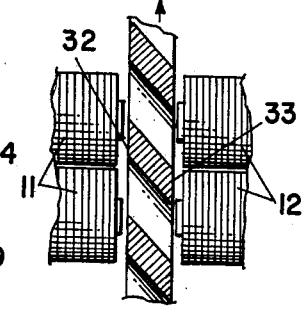
FIGURE 3 is a fragmentary cross section looking generally in the direction of the arrows 3—3 of FIGURE 2.

The foregoing operation will become clearer by referring to FIGURES 2 and 3 wherein the neutral or biased position of the rotor 13 is illustrated with respect to the various electro-magnetic poles 29 for the coils 11. It will be noted with particular reference to FIGURE 3 that the asymmetrical nature of the rotor is such that the face portions 32 are offset from the poles 29 in a first given direction by an amount corresponding to the offset portion of the opposite faces 33 of the pole pieces from the corresponding poles of the additional electro-magnets 12. By this offset rotor construction, if the coils 11 are energized, it is clear that the rotor pole pieces will be urged upwardly as viewed in FIGURE 3 or in a clockwise direction as viewed in FIGURE 2.

Figure 4:
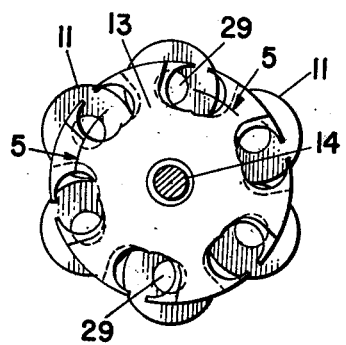
FIGURE 4 is a view similar to FIGURE 2 showing a subsequent position assumed by the rotor when the various coils are energized.
Figure 5:
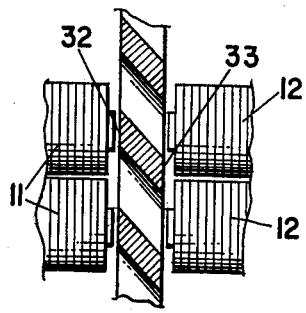
FIGURE 5 is a fragmentary cross section taken generally in the direction of the arrows 5—5 of FIGURE 4.

Referring to FIGURES 4 and 5, the relative position of the rotor pole pieces with respect to the poles 29 is illustrated when the electromagnetic coils 11 are energized. It will be evident that the U-shape configuration of the electro-magnets cooperating with the U-shape structure of the rotor pole pieces provides a very efficient magnetic circuit so that optimum magnetic attraction between the various poles and pole pieces is realized. By providing a plurality of electro-magnets and a plurality of pole pieces, a large number of coil turns may be provided and thus a large magnetic flux may be generated by a pulse of given electrical energy.

If the electro-magnetic coils 12 are energized rather than the coils 11, the rotor will be moved in a counterclockwise direction as viewed in FIGURE 2 or downwardly as viewed in FIGURE 3. When the pulse ceases, the biasing means in the form of the leaf spring structure described in connection with FIGURE 1 will return the rotor to the neutral position as shown in FIGURE 3.

Figure 6:
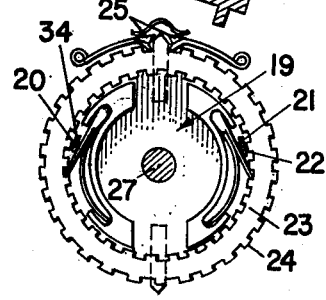
FIGURE 6 is a cross section of the ratchet mechanism taken generally in the direction of the arrows 6—6 of FIGURE 1 when the device is assembled and showing the relative position of the ratchet pawls when the rotor is in a neutral position; and, FIGURE 7 is a view similar to FIGURE 6 showing the relative position of the ratchet pawls when the coils under consideration have been energized.
Figure 7:
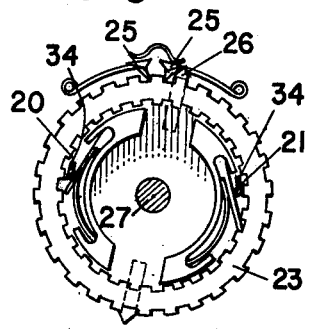

The rotor never completes an entire rotation but simply moves back and forth through a small arc, for example of the order of nine degrees in the embodiment disclosed, and then back to its neutral position. The back-and-forth motion effected is readily translated into a stepped motion of the output shaft 27 by the ratchet mechanism described in the exploded view of FIGURE 1 and further illustrated in FIGURES 6 and 7. Thus, it will be evident that when the rotor moves in a clockwise direction as illustrated in FIGURES 2 and 3, the ratchet pawl 21 will engage the interior teeth 22 to cause rotation of the gear 23 in a clockwise direction as viewed in FIGURE 6, and thus rotate the shaft 27 in a clockwise direction. The initial clockwise movement of the ratchet mechanism 19 and pawl will cause the projection 26 to lift the indexing dogs 25 out of the external gear teeth 24 to free the ratchet gear for such movement. A stationary casing structure corner 34 will bias the opposite ratchet pawl 20 inwardly so that it will not interfere with the movement of the ratchet gear in a clockwise direction through the one step involved. When the shaft 14 and ratchet mechanism 19 are returned to their neutral positions by the spring structure the indexing dogs 25 will be free from the lift projection 26 and will be biased into the next adjacent external teeth 24 and thus hold the gear 23 and shaft 27 in its newly stepped position. The pawl 21 is prevented from engaging the interior gear teeth 22 during the return movement because of the corner 34 of the frame structure engaging the exterior surface of the pawl as described.

Operation of the mechanism is identical for stepping in the other or counterclockwise direction except that pawl 20 drives the gear 23 during initial movement.

Other type ratcheting mechanism may be employed, the above being shown merely as exemplary.

With the foregoing asymmetrical type rotor design in conjunction with the coils arranged in a circular array with their planes normal to the planes of the U-shaped rotor pole piece structures, extremely high torque outputs may be provided for a given size and mass of the instrument. Moreover, because of the simple back-and-forth motion in combination with the relatively simple means for obtaining bidirectional movement through the additional plurality of coils, the device may be made extremely rugged and long life thereof is assured.

Modifications falling clearly within the scope and spirit of this invention will occur to those skilled in the art. The improved stepper motor is therefore not to be thought of as limited to the exact structure set forth merely for illustrative purposes.

What is claimed is:

1. A stepper motor comprising, in combination: a plurality of electro-magnets having their north and south poles alternately positioned in a circular array; a rotor having a shaft co-axial with the axis of said circular array mounting said rotor for rotation, said rotor including a plurality of pole pieces corresponding in number to said poles and positioned juxtaposed said poles; biasing means biasing said rotor to a position in which face portions of said pole pieces are circumferentially offset from said poles in a given direction by a distance less than one-half the circumferential spacing between adjacent poles in said circular array; and ratchet means connected to said rotor shaft whereby energization of said electro-magnets steps said rotor through said given distance to operate said ratchet means, said biasing means returning said rotor to its original position upon de-energization of said coils.

2. A stepper motor according to claim 1, in which said biasing means includes: a cross bar connected to one end of said rotor shaft; and leaf springs having center portions secured in a stationary position and leaf portions sandwiching said cross bar therebetween.

3. A stepper motor according to claim 2, including an additional plurality of electro-magnets having their north and south poles alternately positioned in a circular array co-axial with and axially spaced from said first mentioned circular array, said rotor being positioned between said first mentioned circular array and said second mentioned circular array, and said pole pieces having face portions opposite said first mentioned face portions circumferentially offset from said second mentioned poles in a direction opposite to said given direction by a distance less than one-half the circumferential spacing between adjacent poles in said second mentioned circular array, whereby energization of said additional plurality of electro-magnets steps said rotor in a direction opposite to the direction said rotor is stopped when said first mentioned electro-magnets are energized.

References Cited in the file of this patent

UNITED STATES PATENTS

| | | |
|---|---|---|
| 1,408,555 | Wood | Mar. 7, 1922 |
| 1,536,021 | Kolff | Apr. 28, 1925 |
| 1,787,620 | Favarger | Jan. 6, 1931 |
| 2,428,882 | Koeff | Oct. 14, 1947 |
| 2,900,589 | Putnocky | Aug. 18, 1957 |